(12) United States Patent
Kim et al.

(10) Patent No.: US 8,777,497 B2
(45) Date of Patent: Jul. 15, 2014

(54) BIDIRECTIONAL OPTICAL TRANSCEIVER MODULE

(71) Applicant: Electronics and Telecommunications Research Institute, Daejeon (KR)

(72) Inventors: Min-Su Kim, Daejeon (KR); Suntak Park, Daejeon (KR); Jung Jin Ju, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 51 days.

(21) Appl. No.: 13/632,365

(22) Filed: Oct. 1, 2012

(65) Prior Publication Data
US 2013/0089337 A1 Apr. 11, 2013

(30) Foreign Application Priority Data

Oct. 6, 2011 (KR) .................... 10-2011-0102109
Sep. 7, 2012 (KR) .................... 10-2012-0099200

(51) Int. Cl.
| G02B 6/00 | (2006.01) |
| G02B 5/04 | (2006.01) |
| H04B 10/00 | (2013.01) |
| H05B 3/84 | (2006.01) |
| G12B 9/00 | (2006.01) |

(52) U.S. Cl.
USPC ................................ 385/93; 385/14; 385/18

(58) Field of Classification Search
CPC ...... G02B 5/00; G02B 5/204; G02B 27/1046; G02B 27/141; G02B 27/144
USPC ....................................................... 385/93, 14
See application file for complete search history.

(56) References Cited

U.S. PATENT DOCUMENTS 5,408,559 A * 4/1995 Takahashi et al. .............. 385/89
6,664,998 B1 * 12/2003 Kyoya et al. ................... 347/241
(Continued)

FOREIGN PATENT DOCUMENTS

| JP | 2010-072534 A | 4/2010 |
| KR | 10-2007-0087922 A | 8/2007 |
| KR | 10-0982018 B1 | 9/2010 |

Primary Examiner — Kaveh Kianni
(74) Attorney, Agent, or Firm — Rabin & Berdo, P.C.

(57) ABSTRACT

Disclosed is a bidirectional optical transceiver module having an efficient optical coupling structure. The bidirectional optical transceiver module according to an exemplary embodiment of the present disclosure includes a first structure which has a hexahedron shape, has four side surfaces of which two side surfaces are formed to be inclined at a predetermined angle with respect to a bottom surface, and is transparent to both a transmitted light component and a received light component; and at least one second structure which has a planar shape, is inserted in the first structure so as to form a right angle with the bottom surface of the first structure and be tilted by a predetermined angle from a direction of the transmitted light component or the received light component, and is transparent to one of the transmitted light component and the received light component and reflective of the other one.

18 Claims, 4 Drawing Sheets

(56) References Cited

U.S. PATENT DOCUMENTS

| | | | |
|---|---|---|---|
| 6,792,181 B2* | 9/2004 | Sasaki | 385/37 |
| 7,116,412 B2* | 10/2006 | Takahashi et al. | 356/138 |
| 7,447,243 B2* | 11/2008 | Aoshima et al. | 372/21 |
| 7,680,417 B2 | 3/2010 | Epitaux et al. | |
| 2002/0001427 A1* | 1/2002 | Hashimoto et al. | 385/14 |
| 2003/0128916 A1* | 7/2003 | Sasaki | 385/24 |
| 2006/0039441 A1* | 2/2006 | Aoshima et al. | 372/92 |
| 2006/0152726 A1* | 7/2006 | Larsen et al. | 356/416 |
| 2006/0198576 A1* | 9/2006 | Furusawa et al. | 385/24 |
| 2008/0226228 A1* | 9/2008 | Tamura et al. | 385/33 |
| 2009/0040910 A1* | 2/2009 | Fukakusa et al. | 369/112.29 |
| 2009/0047024 A1* | 2/2009 | Wang et al. | 398/135 |
| 2010/0290128 A1* | 11/2010 | Sugitatsu | 359/634 |

* cited by examiner

BIDIRECTIONAL OPTICAL TRANSCEIVER MODULE

CROSS-REFERENCE TO RELATED APPLICATIONS

This application is based on and claims priority from Korean Patent Application No. 10-2011-0102109, filed on Oct. 6, 2011, and Korean Patent Application No. 10-2012-0099200, filed on Sep. 7, 2012, with the Korean Intellectual Property Office, the disclosure of which is incorporated herein in its entirety by reference.

TECHNICAL FIELD

The present disclosure relates to a bidirectional optical transceiver module, and more specifically, to a technology for more efficiently configuring a multi-channel bidirectional optical transceiver module.

BACKGROUND

As an information and communication technology is developed and the utilization thereof is diversified, an application of an high-speed large-capacity information transmission technology based on optical communication is widely spreading not only in telecommunication covering several tens to several hundreds of kilometers but also in a field of data communication within several tens of meters. Recently, even in an ultra short range of several meters to several centimeters such as information transmission between a computer and peripherals, signal transmission for high resolution display devices, and signal transmission between boards in mobile devices, the necessity of an application of a high-speed large-capacity data communication technology is getting focused. Therefore, the integration and the cost reduction of an optical transceiver module are becoming an important technological issue.

As representative technologies that cope with the steeply increased demand for an information transmission technology based on optical communication in a data communication regime, a time-division multiplexing technology that improves an optical signal transmission rate per channel and a parallel optics technology to which several strands of optical fiber lines are applied are suggested. However, the increase in the number of optical fiber lines causes the increase in volume of the optical transceiver module, which negatively affects the module integration.

In the meantime, in an optical transmission system for a user access network according to a related art, a bidirectional optical transceiver module in which two different wavelengths are applied respectively to upstream and downstream of the same optical fiber line is considered as an important technical factor in the view of integration and cost reduction. A module which is configured by applying the method is usually referred to as a bidirectional optical subassembly (BOSA) or a BiDi module.

FIG. 1 is a view illustrating a general configuration of a BiDi module according to a related art.

Referring to FIG. 1, the BiDi module according to a related art includes an optical fiber 101, an optical filter 103, a light source element 105, and a light receiving element 107. The optical filter 103 assigns different optical paths to a transmitted light component and a received light component having respective wavelengths $\lambda_1$ and $\lambda_2$ and the light source element 105 and the light receiving element 107 which are formed as TO-can package shapes are arranged with an angle of 90 degrees to each other with reference to the optical filter 103.

For the purpose of integration and cost reduction of the optical transceiver module for high-speed large-capacity data communication, a configuration principle of the BiDi module in FIG. 1 may be applied. In this case, it is possible to reduce the number of transmission lines of the optical transceiver module by half. However, in the case of the configuration based on the TO-can package, there is still limitation on the integration of the module. Considering also that distances between the light source element and a driver IC and between the light receiving element and an amplifier IC need to be short for optical signal transmission at a high bit rate of 10 Gbps or higher, the configuration needs to be improved essentially. Furthermore, when an optical fiber array is applied in order to adapt the necessity of the large-capacity information transmission by getting away from a two-dimensional structure of the BiDi module of the related art, a structure of an optical transceiver module which is capable of efficient optical coupling and alignment is required.

SUMMARY

The present disclosure has been made in an effort to provide a bidirectional optical transceiver module having an efficient optical coupling structure which is applicable to high-speed large-capacity data communication and is advantageous for integration and cost reduction of the module.

An exemplary embodiment of the present disclosure provides a bidirectional optical transceiver module including: a first structure which has a hexahedron shape and has four side surfaces of which two side surfaces are formed to be inclined at a predetermined angle with respect to a bottom surface; and at least one second structure which has a planar shape and is inserted in the first structure so as to form a right angle with the bottom surface of the first structure and be tilted by a predetermined angle from a direction of the transmitted light component or the received light component. The bidirectional optical transceiver module may further include a circuit board which faces the bottom surface of the first structure and in which one or more light source elements and one or more light receiving elements having parallel optic axes are integrated; and one or more optical transmission media which are disposed so as to be close to or in contact with one side surface of the first structure.

The first structure may be transparent to both the transmitted light component and the received light component having different wavelengths and the second structure may be transparent to one of the transmitted light component and the received light component and reflective of the other one.

The bidirectional optical transceiver module may further include: optical reflective layers which are formed on the inclined side surfaces of the first structure.

The bidirectional optical transceiver module may further include: two or more lenses which are formed in regions of the bottom surface of the first structure covered by the inclined side surfaces. The transmitted light component and the received light component may be incident on or emitted from the first structure through the lenses.

The bidirectional optical transceiver module may further include one or more lenses which are formed on the side surface of the first structure which is close to or in contact with the optical transmission media and optical paths between the first structure and the optical transmission media may be formed through the lenses.

The second structure may be implemented by an optical filter or a dichroic beam splitter.

According to exemplary embodiments of the present disclosure, by applying a combination structure of the first structure which has a hexahedron shape having two or more inclined side surfaces and a second structure which is inserted in the first structure to an optical transceiver module having a multi-channel array structure, integration and cost reduction of a high-speed large-capacity optical transceiver module based on the bidirectional optical communication technology may be achieved.

Moreover, by efficiently utilizing a space, the distances between the light source element, the light receiving element, and electronic ICs are shortened, which may improve the performance of the optical data communication at a high bit rate.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Figure 2A:
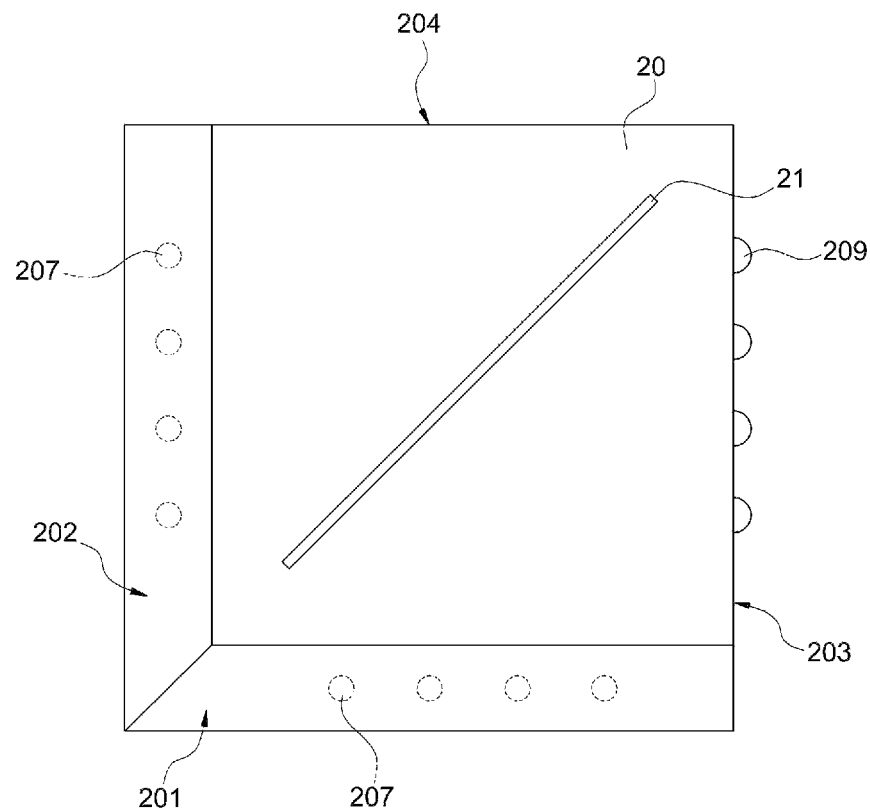
FIGS. 2A and 2B are configuration diagrams of a bidirectional optical transceiver module according to an exemplary embodiment of the present disclosure.
Figure 2B:
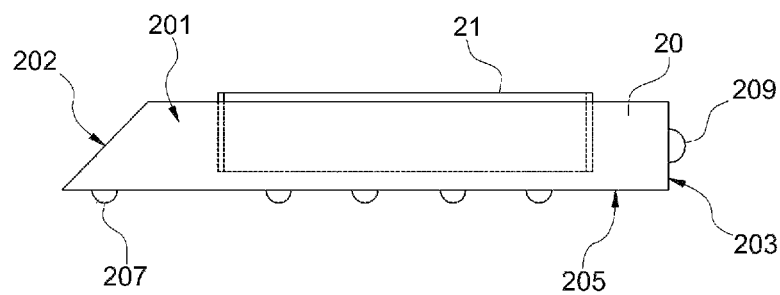

FIGS. 2A and 2B are configuration diagrams of a bidirectional optical transceiver module according to an exemplary embodiment of the present disclosure, in which FIG. 2A is a plan view of the module and FIG. 2B is a front view.

Referring to FIGS. 2A and 2B, the bidirectional optical transceiver module according to the exemplary embodiment of the present disclosure includes a first structure 20 which has a hexahedron shape and has four side surfaces of which first and second side surfaces 201 and 202 are formed to be inclined at a predetermined angle (45 degrees in this exemplary embodiment) with respect to a bottom surface 205 and a second structure 21 which has a planar shape and is inserted in the first structure 20 so as to form a right angle with the bottom surface 205 and be tilted by a predetermined angle (45 degrees in this exemplary embodiment) from a direction of a transmitted light component or a received light component. In this case, the first structure 20 is transparent to all of the transmitted light component and the received light component having different wavelengths, and the second structure 21 is transparent to one of the transmitted light component and the received light component and reflective of the other one.

On the first and second side surfaces 201 and 202, optical reflective layers which are coated with a metal or dielectric substances may be further formed in order to improve an optical coupling efficiency with respect to an incident region and an emitting region for each of the transmitted light component and the received light component in the first structure 20, that is, regions of the bottom surface 205 that are covered by the first and second side surfaces 201 and 202. A structure having a predetermined difference in refractive indexes may be further inserted in specific areas in the first structure 20 or a change in a refractive index within the first structure 20 may be induced in order to reduce an optical loss in the first structure 20 due to the diffusion and scattering of light.

On the bottom surface 205 of the first structure 20, a plurality of lenses 207 may be formed in order to achieve efficient optical coupling by an optical collimation effect. Specifically, the plurality of lenses 207 may be formed in the regions of the bottom surface 205 of the first structure 20 which are covered by the first and second side surfaces 201 and 202. In this case, since optical path lengths for the light components with the two different wavelengths may be equal to each other, there may be an advantage in that the same structure may be applied to all lenses 207 which are formed on the bottom surface 205 if needed for the convenience in the design and manufacture.

One or more lenses 209 for optical coupling to optical transmission media (see FIGS. 4 and 5) may be further formed on a third side surface 203 of the four side surfaces of the first structure 20 which forms a right angle with the bottom surface 205.

As the second structure 21, an optical filter or a dichroic beam splitter may be applied.

Figure 2C:
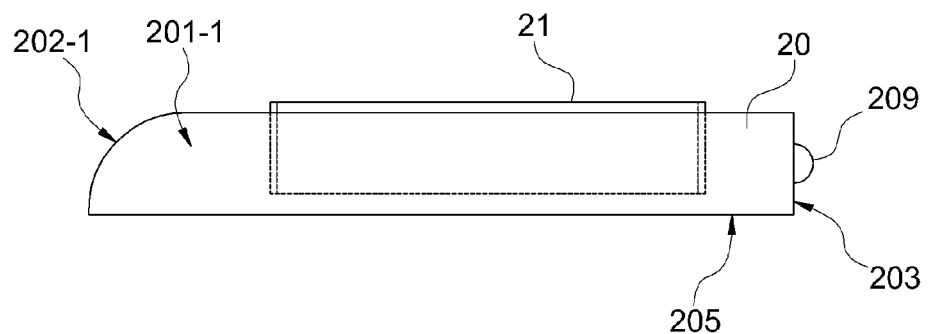
FIG. 2C is a view illustrating an example that implements inclined side surfaces of a first structure as convex shapes, as a modified example of the exemplary embodiment of FIGS. 2A and 2B.

In the meantime, as illustrated in FIG. 2C, instead of the plurality of lenses 207 formed on the bottom surface 205 of the first structure 20, two side surfaces of the first structure 20 may be substituted with convex structures 201-1 and 202-1. In this case, since the convex structures 201-1 and 202-1 replace a light focusing function of the lenses 207, a similar effect as with the lens structure in FIGS. 2A and 2B may be obtained.

As described in the above exemplary embodiment, in the view of cost reduction of the module, it is better for the second structure 21 to be formed as a monolithic structure and inserted in the first structure 20. However, if needed, the second structure 21 may be configured by two or more structures to be inserted in different regions of the first structure 20.

Figure 3:
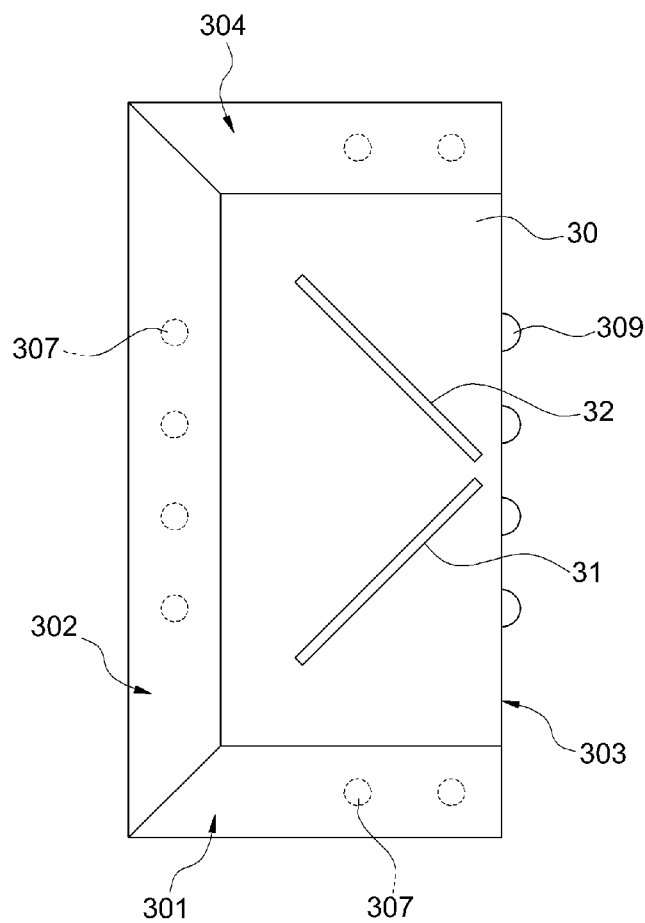
FIG. 3 is a configuration diagram of a bidirectional optical transceiver module according to another exemplary embodiment of the present disclosure.

FIG. 3 is a configuration diagram of a bidirectional optical transceiver module according to another exemplary embodiment of the present disclosure and illustrates an example that two second structures 31 and 32 are inserted in a first structure 30. Referring to FIG. 3, the bidirectional optical transceiver module according to this exemplary embodiment includes a first structure 30 which has a hexahedron shape and has four side surfaces of which first, second, and third side surfaces 301, 302, and 304 are formed to be inclined at a predetermined angle (45 degrees in this exemplary embodiment) with respect to a bottom surface 205 and two second structures 31 and 32 which has planar shapes and are inserted in the first structure 30 so as to form a right angle with the bottom surface 205 and be tilted by a predetermined angle (45 degrees and −45 degrees in this exemplary embodiment) from a direction of a transmitted light component or a received light component. In this case, the first structure 30 is transparent to all of the transmitted light component and the received light component having different wavelengths and the second structures 31 and 32 are transparent to one of the transmitted light component and the received light component and reflective of the other one.

In this embodiment, one of the second structures 31 reflects a light component which enters through a fourth side surface 303 of the first structure 30 onto the first side surface 301 and the other of the second structures 32 reflects a light component which enters through the fourth side surface 303 onto the third side surface 304. In this case, a width of the first structure 30 is reduced to about a half as compared with the exemplary embodiment of FIGS. 2A and 2B so that optical path lengths are shortened.

Figure 4:
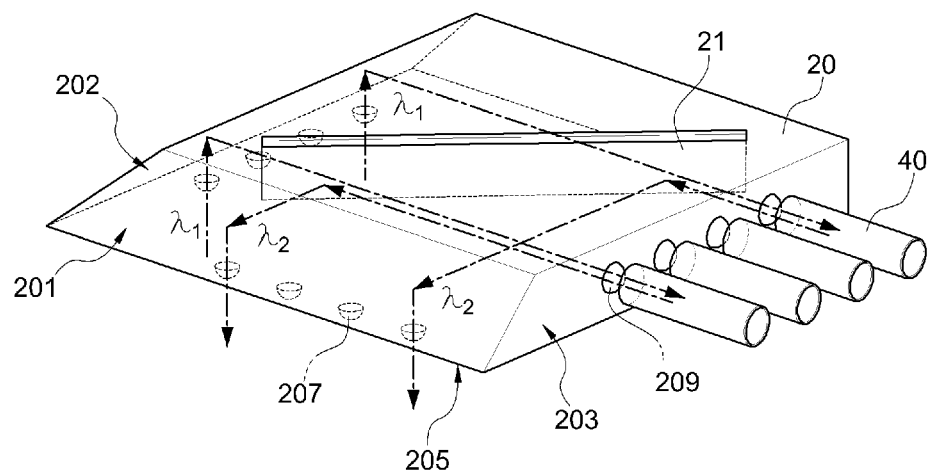
FIG. 4 is a view illustrating an operating method of the bidirectional optical transceiver module according to the exemplary embodiment of FIGS. 2A and 2B.

FIG. 4 is a view illustrating an operating method of the bidirectional optical transceiver module according to the exemplary embodiment of FIGS. 2A and 2B.

In FIG. 4, arrows depicted in two different directions indicate the transmitted light component having a wavelength of $\lambda_1$ and the received light component having a wavelength of $\lambda_2$.

The transmitted light component which enters into the first structure 20 through the lenses 207 formed on the bottom surface 205 of the first structure 20 is reflected by the second side surface 202 and passes through the second structure 21 to enter into the optical transmission media 40 through the lenses 209 formed on the third side surface 203. In contrast, the received light component emitted from the optical transmission media 40 enters into the first structure 20 through the lenses 209, is reflected by the second structure 21, and then reflected again by the first side surface 201 to be emitted through the lenses 207 of the bottom surface 205. In this way, it is possible to implement an efficient bidirectional optical transceiver module using the first structure 20 having a unique shape and the second structure 21 that has different transmission and reflection characteristics depending on a wavelength.

Figure 5:
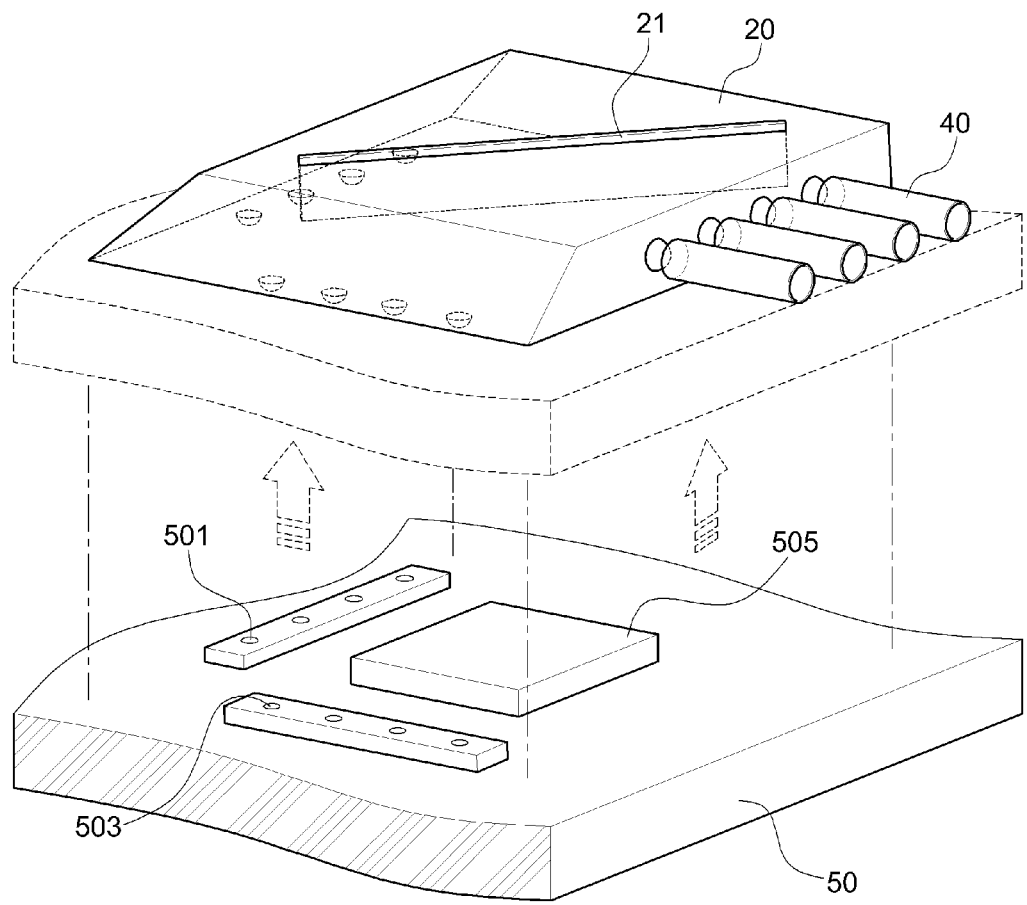
FIG. 5 is a view illustrating a bidirectional optical transceiver module which further includes a circuit board in which multi-channel light source element and light receiving element are integrated along with the exemplary embodiment of FIGS. 2A and 2B.

FIG. 5 is a view illustrating a bidirectional optical transceiver module which further includes a circuit board in which multi-channel light source element and light receiving element are integrated along with the exemplary embodiment of FIGS. 2A and 2B.

Referring to FIG. 5, the bidirectional optical transceiver module according to the exemplary embodiment of the present disclosure includes a circuit board 50 in which one or more light source elements 501 and one or more light receiving elements 503 which have parallel optic axes are integrated, a first structure 20 having a hexahedron shape in which a bottom surface 205 faces the circuit board 50 and first and second side surfaces 201 and 202 of four side surfaces are formed to be inclined at a predetermined angle (45 degrees in this exemplary embodiment) with respect to the bottom surface 205 and transparent to all of a transmitted light component and a received light component, a second structure 21 having a planar shape which is inserted in the first structure 20 so as to form a right angle with the bottom surface 205 and be tilted by a predetermined angle (45 degrees in this exemplary embodiment) from a direction of the transmitted light component or the received light component, and one or more optical transmission media 40 which are disposed so as to be close to or in contact with a third side surface 203 of the first structure 20. The second structure 21 is transparent to one of the transmitted light component and the received light component and reflective of the other one.

Figure 1:
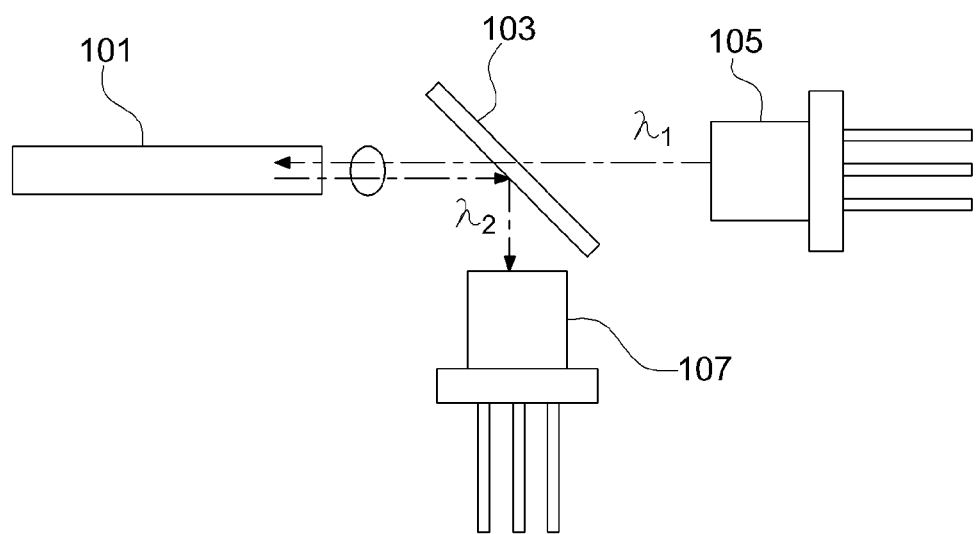
FIG. 1 is a view illustrating a general configuration of a BiDi module according to a related art.

The bottom surface 205 of the first structure 20 may be disposed so as to face the circuit board 50. In this case, the plurality of light source elements 501 and the plurality of light receiving elements 503 are arranged on the circuit board 50 so as to be aligned to have parallel optic axes along which the light components enter into or are emitted from the bottom surface 205 of the first structure 20. In this case, alignment pins or alignment grooves (not illustrated in the drawing) may be additionally formed in a specific region of the circuit board 50 and the first structure 20. By doing this, the convenience and efficiency of alignment between the light source elements 501, the light receiving elements 503, and the first structure 20 may be further improved. This structure removes the problems in that when the structure of a related art illustrated in FIG. 1 is applied, the light source elements and the light receiving elements are housed separately or mounted on separate substrates, thereby advantageously improving integration and cost reduction of the optical module.

The optical coupling structure illustrated in FIG. 5 has an advantage in mounting an electronic IC 505 such as a driver or an amplifier which is essentially required to drive the light source element 501 or the light receiving element 503 and improving the performance of the optical transceiver module. In a high-speed optical transceiver module, if the distance between the driver and the light source element or between the amplifier and the light receiving element is getting longer, the performance is seriously lowered. However, as illustrated in FIG. 5, if the electronic IC 505 is mounted in a region close to the light source element 501 and the light receiving element 503 on the circuit board 50 which faces the bottom surface 205 of the first structure 20, the above-mentioned problems may be readily resolved.

In this case, as well as a method of mounting a single IC that drives all of the light source elements and the light receiving elements, a method of mounting a multi-channel driver and a multi-channel amplifier so as to be close to each of a light source element array and a light receiving element array or mounting separate drivers and amplifiers for each channel may also be applied if necessary.

It is noted that the exemplary embodiments which have been described above are not limit to the present disclosure. The one skilled in the art may understand that various modifications may be made without departing from the scope and spirit of the present disclosure. For example, lenses are not provided on the light incident surface and the light emitting surface of the first structure, but may be provided at sides of the optical fiber, the light source element and the light receiving element or are formed therebetween separately, which is apparently not departing from the scope of the present disclosure. It is also considered that the bottom surface of the first structure and a side surface which is close to or in contact with the optical transmission media form an angle of 45 degrees and lenses on the side surface which is close to or in contact with the optical transmission media are replaced by lenses formed on the bottom surface. In this case, it is easily understood that there is no difference in other aspects except that the optical transmission media are mounted so as to be perpendicular to the optical coupling structure and the circuit board.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A bidirectional optical transceiver module, comprising:
    a first structure which has a hexahedron shape, has four side surfaces of which two side surfaces are formed to be inclined at a predetermined angle with respect to a bottom surface, and is transparent to both a transmitted light component and a received light component; and
    at least one second structure which has a planar shape and surrounded by said surfaces, is inserted in the first structure so as to form a right angle with the bottom surface of the first structure and be tilted by a predetermined angle from a direction of the transmitted light component or the received light component, and is transparent to one of the transmitted light component and the received light component and reflective of the other one.

2. The bidirectional optical transceiver module of claim 1, further comprising:
    optical reflective layers which are formed on the inclined side surfaces of the first structure.

3. The bidirectional optical transceiver module of claim 1, further comprising:
    two or more lenses which are formed in regions of the bottom surface of the first structure covered by the inclined side surfaces,
    wherein the transmitted light component and the received light component are incident on or emitted from the first structure through the lenses.

4. The bidirectional optical transceiver module of claim 1, wherein the angle formed by the inclined side surfaces and the bottom surface is 45 degrees.

5. The bidirectional optical transceiver module of claim 1, wherein the inclined side surfaces are formed as convex shapes.

6. The bidirectional optical transceiver module of claim 1, wherein the angle formed by the direction of the transmitted light component or the received light component and the second structure is 45 degrees.

7. The bidirectional optical transceiver module of claim 1, wherein the second structure is an optical filter or a dichroic beam splitter.

8. A bidirectional optical transceiver module, comprising:
    a circuit board in which one or more light source elements and one or more light receiving elements which have parallel optic axes are integrated;
    a first structure which has a bottom surface facing the circuit board, has a hexahedron shape, has four side surfaces of which two side surfaces are formed to be inclined at a predetermined angle with respect to the bottom surface, and is transparent to both a transmitted light component and a received light component;
    at least one second structure which has a planar shape and surrounded by said surfaces, is inserted in the first structure so as to form a right angle with the bottom surface of the first structure and be tilted by a predetermined angle from a direction of the transmitted light component or the received light component, and is transparent to one of the transmitted light component and the received light component and reflective of the other one; and
    one or more optical transmission media that are disposed to be close to or in contact with one side surface of the first structure.

9. The bidirectional optical transceiver module of claim 8, further comprising:
    optical reflective layers which are formed on the inclined side surfaces of the first structure.

10. The bidirectional optical transceiver module of claim 8, wherein the one or more light source elements are aligned so as to allow the light to be incident onto one inclined side surface of the first structure through the bottom surface of the first structure and the one or more light receiving elements are aligned so as to collect the light which is reflected from the other inclined side surface of the first structure to be emitted through the bottom surface of the first structure.

11. The bidirectional optical transceiver module of claim 10, further comprising:
    two or more lenses which are formed in regions of the bottom surface of the first structure covered by the inclined side surfaces,
    wherein the transmitted light component which is emitted from the light source elements is incident to the first structure through some of the lenses and the received light component is emitted through the other lenses to be incident onto the light receiving elements.

12. The bidirectional optical transceiver module of claim 8, wherein the angle formed by the inclined side surfaces and the bottom surface is 45 degrees.

13. The bidirectional optical transceiver module of claim 8, further comprising:
    one or more lenses which are formed on the side surface of the first structure which is close to or in contact with the optical transmission media,
    wherein optical paths between the first structure and the optical transmission media are formed through the lenses.

14. The bidirectional optical transceiver module of claim 8, wherein the optical transmission media are optical fibers or planar optical waveguides.

15. The bidirectional optical transceiver module of claim 8, wherein the inclined side surfaces are formed as convex shapes.

16. The bidirectional optical transceiver module of claim 8, wherein the angle formed by the direction of the transmitted light component or the received light component and the second structure is 45 degrees.

17. The bidirectional optical transceiver module of claim 8, wherein the second structure is an optical filter or a dichroic beam splitter.

18. The bidirectional optical transceiver module of claim 8, further comprising:
    an electronic IC which is mounted in a region of the circuit board close to the light source element and the light receiving element to drive the light source element and the light receiving element.

* * * * *